(12) United States Patent
Winefordner et al.

(10) Patent No.: US 10,583,892 B1
(45) Date of Patent: Mar. 10, 2020

(54) CLIPLESS BICYCLE PEDAL

(71) Applicant: Crank Brothers, Inc., Laguna Beach, CA (US)

(72) Inventors: Carl Winefordner, Laguna Beach, CA (US); Frank Hermansen, Laguna Beach, CA (US)

(73) Assignee: CRANK BROTHERS, INC., Laguna Beach, CA (US)

( * ) Notice: Subject to any disclaimer, the term of this patent is extended or adjusted under 35 U.S.C. 154(b) by 0 days.

(21) Appl. No.: 16/213,592

(22) Filed: Dec. 7, 2018

(51) Int. Cl.
*B62M 3/00* (2006.01)
*B62M 3/08* (2006.01)

(52) U.S. Cl.
CPC .................. *B62M 3/086* (2013.01)

(58) Field of Classification Search
CPC .................. B62M 3/08; B62M 3/086
See application file for complete search history.

(56) References Cited

U.S. PATENT DOCUMENTS

| | | | |
|---|---|---|---|
| 6,205,885 B1 * | 3/2001 | Hermansen | B62M 3/086 74/594.6 |
| 6,851,189 B2 * | 2/2005 | Hermansen | B62M 3/086 29/897.2 |
| 7,225,703 B2 * | 6/2007 | Winefordner | B62M 3/00 74/594.4 |
| 7,258,042 B2 * | 8/2007 | Couturet | B62M 3/086 74/594.4 |
| 7,743,682 B2 * | 6/2010 | Couturet | B62M 3/086 74/594.6 |
| 2005/0204860 A1 * | 9/2005 | Winefordner | B62M 3/00 74/594.1 |
| 2007/0137429 A1 * | 6/2007 | Wang | B62M 3/086 74/594.6 |

FOREIGN PATENT DOCUMENTS

FR      2822433 A1 *  9/2002  ............ B62M 3/086

* cited by examiner

*Primary Examiner* — Adam D Rogers
(74) *Attorney, Agent, or Firm* — Tutunjian & Bitetto, P.C.

(57) ABSTRACT

A clipless bicycle pedal including an axle, connectable to a bicycle crank arm, and a locking mechanism, connected to the axle, suitable to engage/disengage a cleat assembly of a cycling shoe. The locking mechanism includes a sleeve, inserted along the axle, an inner loop and an outer loop, inserted along the sleeve and free to rotate around the sleeve, so that the inner loop is contained within the outer loop. The locking mechanism further includes a cam, included between the inner loop and the outer loop, suitable to hold the inner loop and the outer loop in an engagement configuration of the cleat assembly. The cam is also suitable to allow rotational movement of the inner, outer loops relative to each other, from the engagement configuration to a disengagement configuration of the cleat assembly.

20 Claims, 8 Drawing Sheets

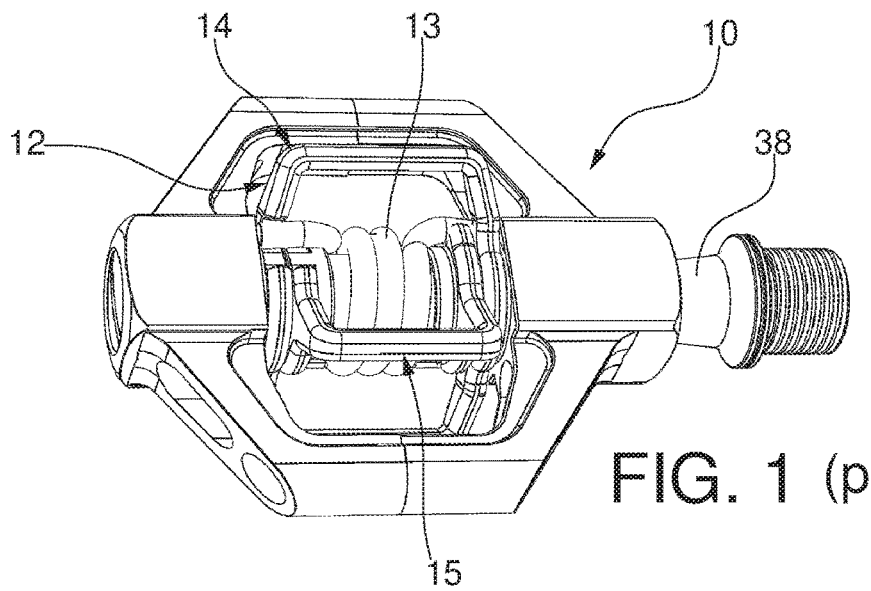
FIG. 1 (prior art)
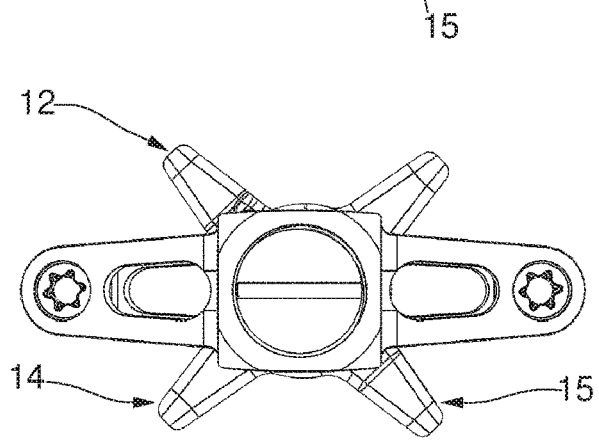
FIG. 2 (prior art)
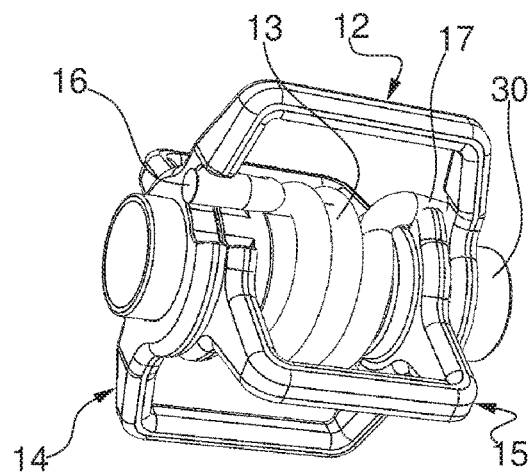
FIG. 3 (prior art)
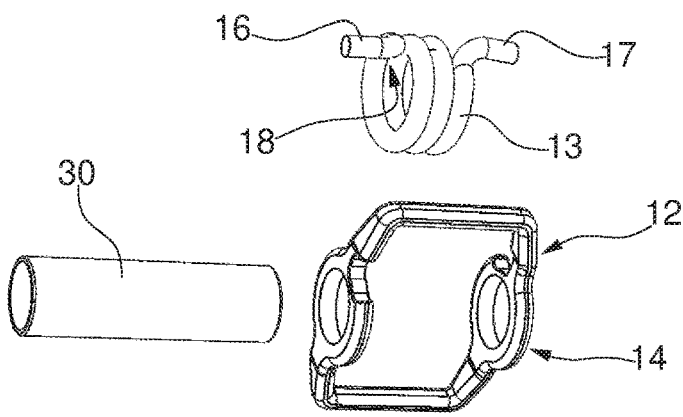
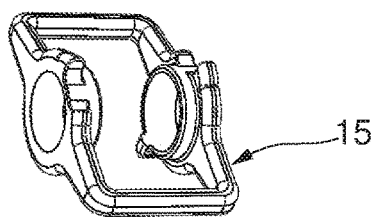
FIG. 4 (prior art)

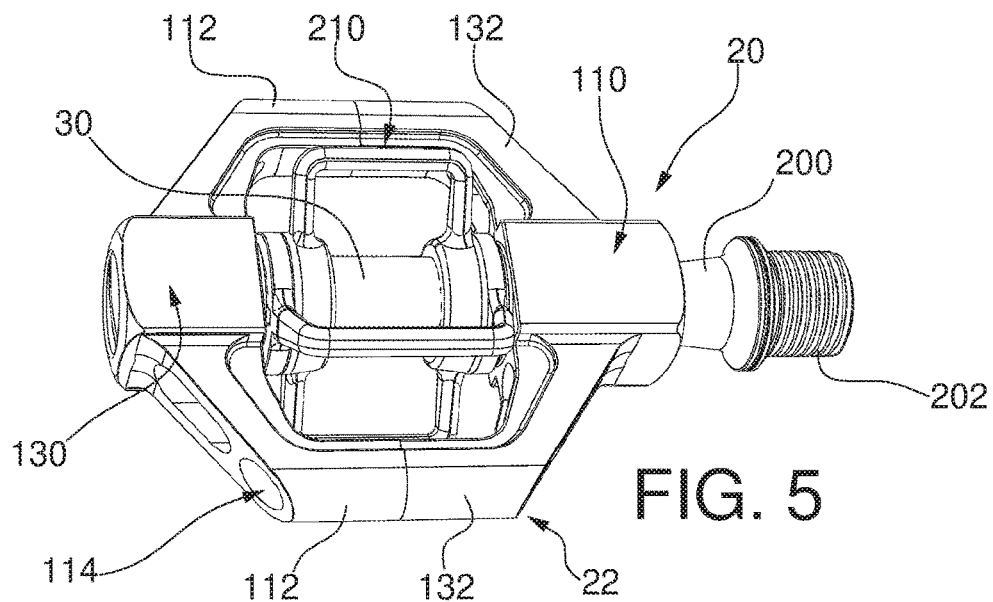
FIG. 5
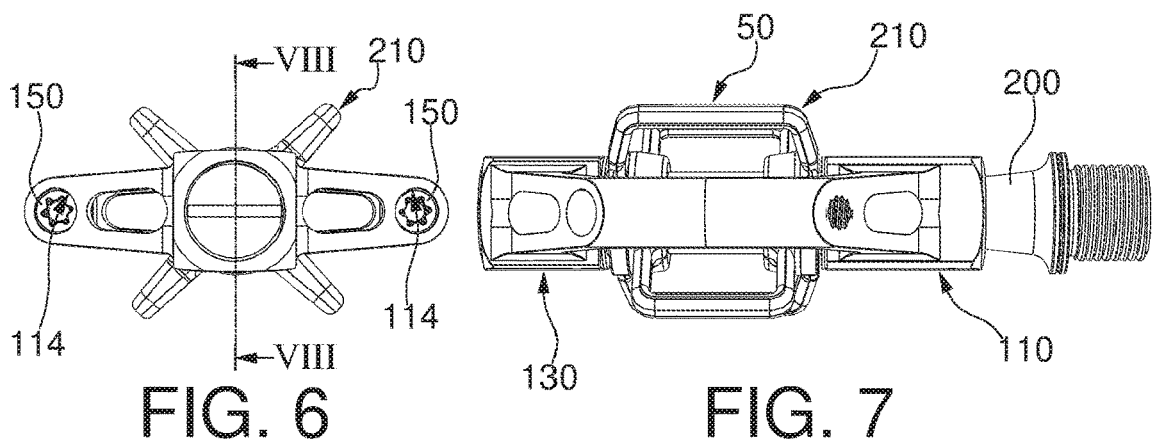
FIG. 6
FIG. 7
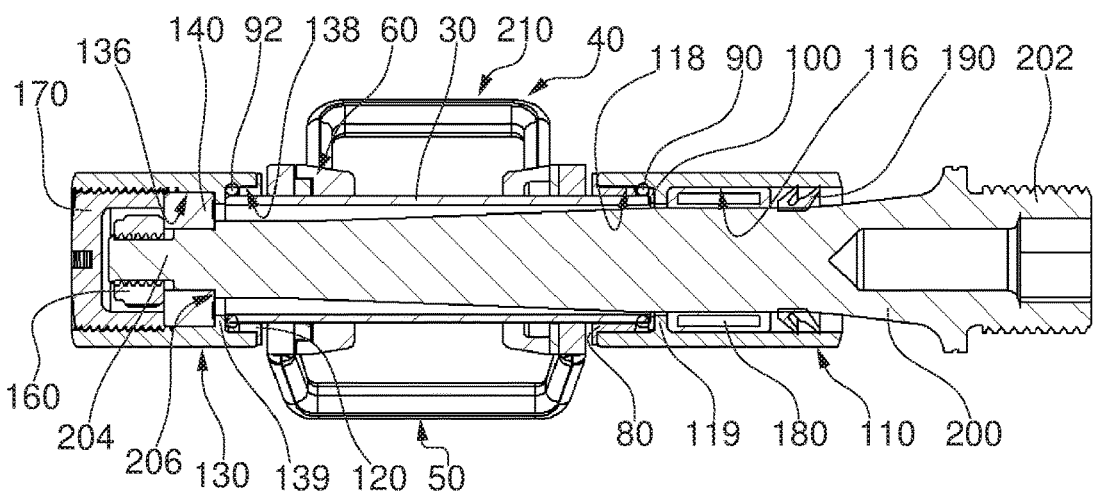
FIG. 8

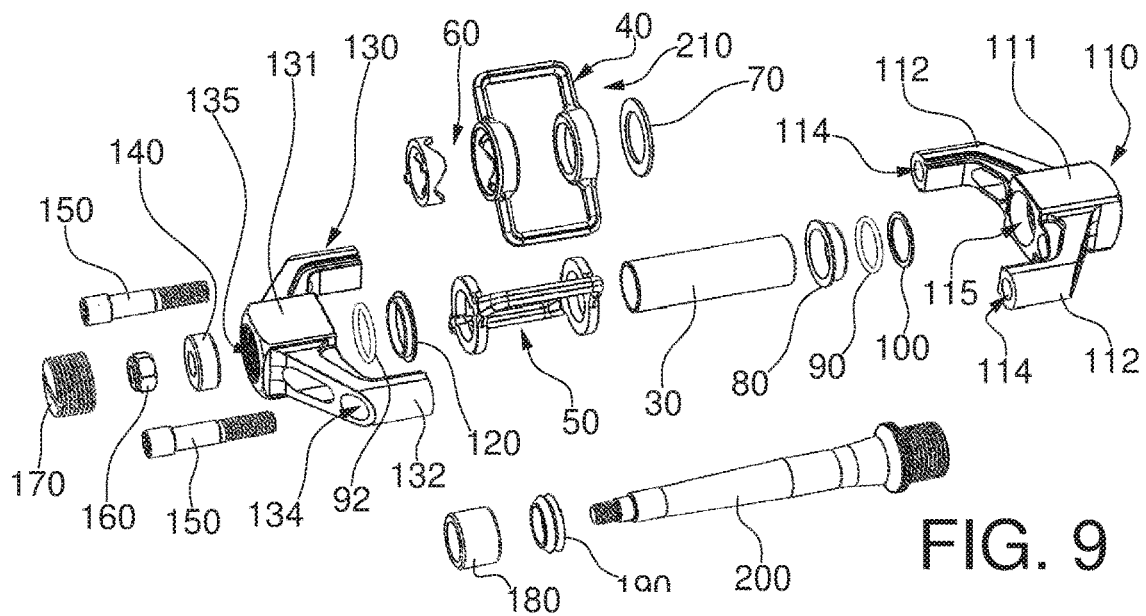
FIG. 9
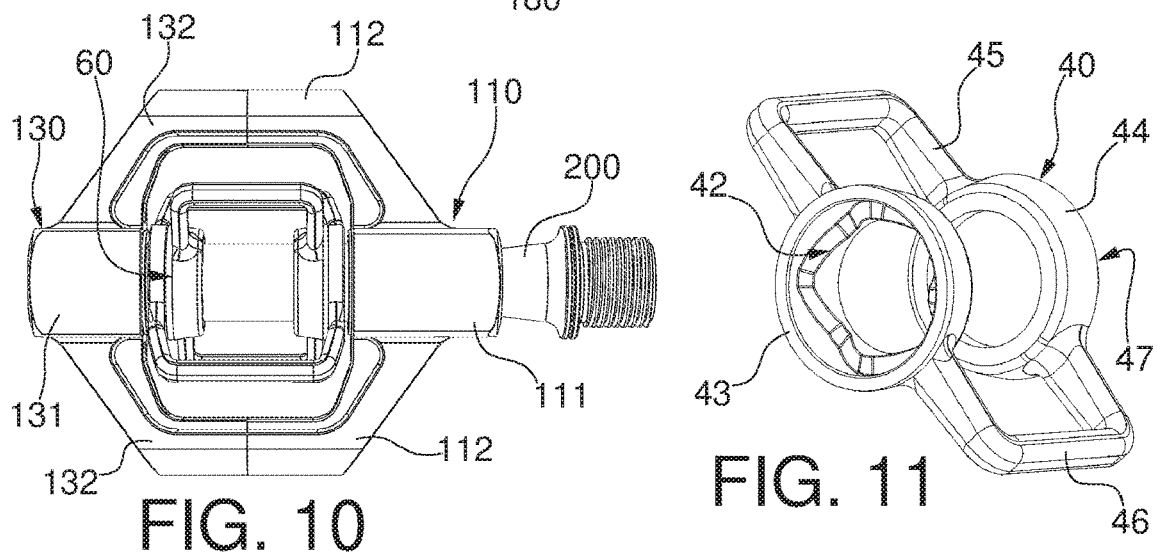
FIG. 10
FIG. 11
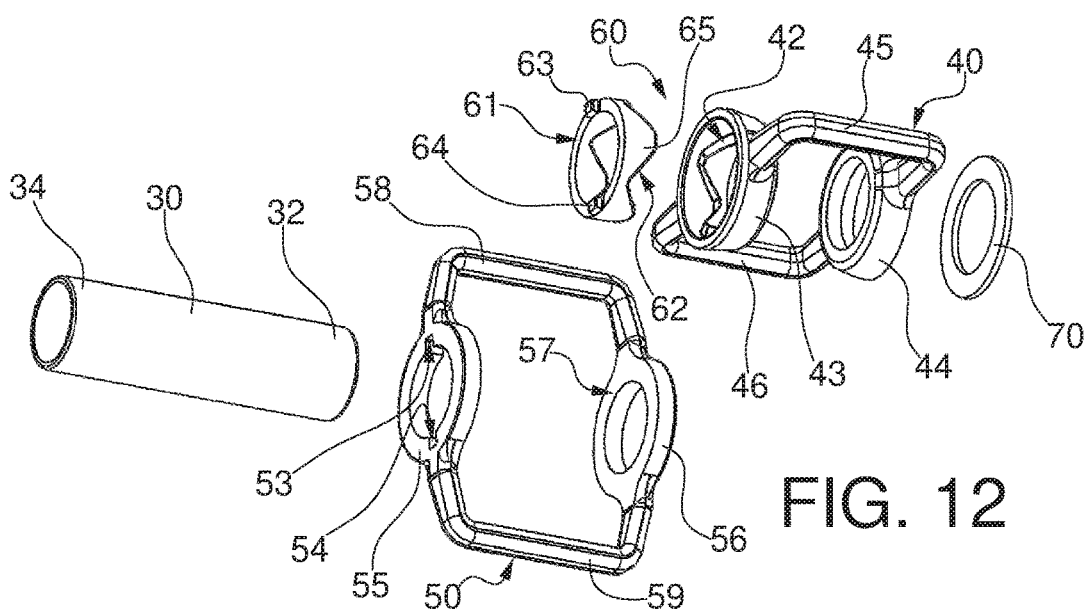
FIG. 12

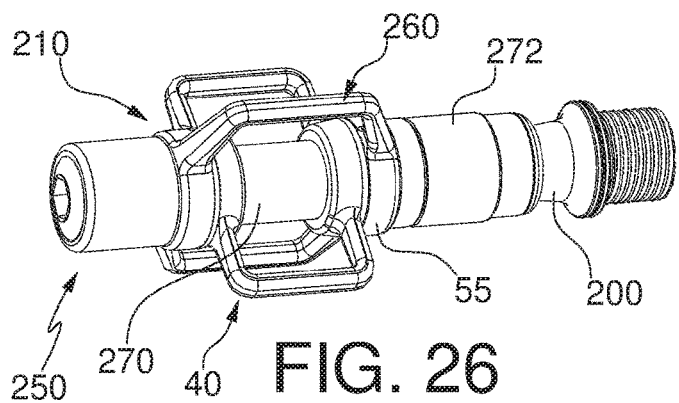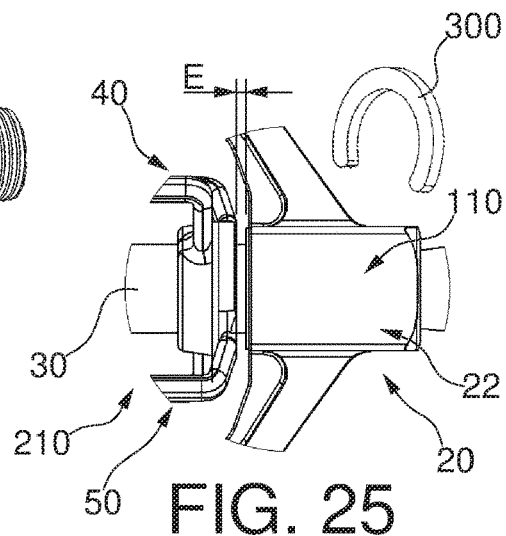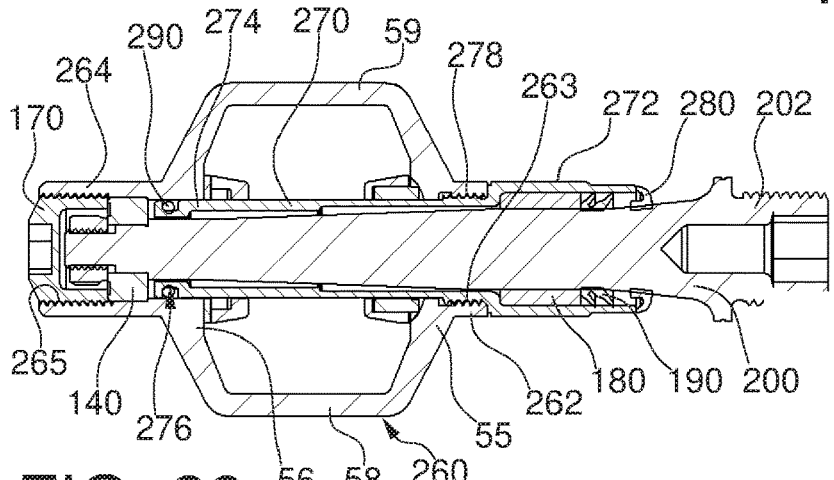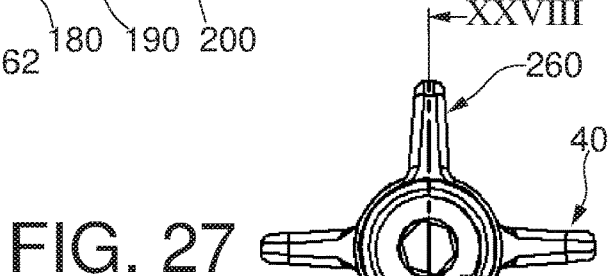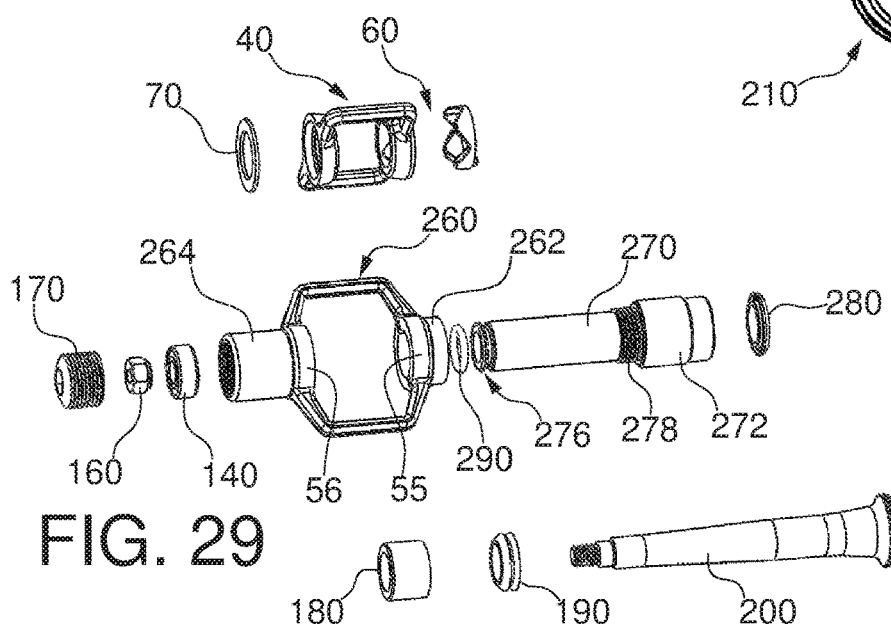

CLIPLESS BICYCLE PEDAL

FIELD OF THE INVENTION

The present invention relates to a clipless bicycle pedal.

BACKGROUND OF THE INVENTION

Clipless bicycle pedals are pedals in which the traditional toe clip, or cage, is replaced by a locking mechanism with which a cleat, fixed to the bottom of the rider's shoe, is engaged, allowing the rider to be securely connected to the pedal during pedal strokes, yet also allowing easy disengagement with a simple twist of the foot.

Clipless pedals should ideally be strong and durable, rebuildable for maintenance, light weight, and properly working even when the pedal and/or shoe is covered with mud and debris.

One of the best clipless pedals currently available, also known as "eggbeater" pedal, has four sides for cleat engagement.

In versions without a separate pedal body, the entire pedal is free to rotate to allow cleat engagement with any of the four sides.

In this kind of pedals, the locking mechanism is comprised of two loops, which are held perpendicular to each other by a coil spring: therefore, the two loops are spring loaded relative to each other.

In versions with a pedal body, the four-sided mechanism can rotate within the body, to allow clip engagement with any of the four sides: this allows easy engagement, regardless of the pedal position.

A pedal of this type is shown in FIGS. 1-4, while a cleat assembly suitable to engage with such pedal is shown in FIG. 35.

The pedal 10 includes a four-sided locking mechanism 12 for engagement with cleat assembly 400 (FIG. 34).

Locking mechanism 12 includes a sleeve 30 (see FIGS. 3,4), which is insertable along the axle 38 of the pedal 10.

The locking mechanism 12 further includes a coil spring 13, an outer loop 14 and an inner loop 15, all inserted along the sleeve 30.

The opposite legs 16,17 of the coil spring 13 respectively engage with the outer loop 14 and with the inner loop 15, and they hold loops 14,15 perpendicular to each other. The inner side surface 18 of the coil spring 13 is supported by sleeve 30.

These pedals have become the benchmark in engagement/disengagement ease, ease of rebuilding, mud shedding function, and they are also extremely light weight.

However, these pedals have some disadvantages, as clarified below.

The coil spring of the pedal is inserted along a supporting sleeve, and a fixture is required to assemble the loop/spring mechanism, because the coil spring forces the sleeve to be off-center during assembly.

This is necessary for the coil spring to preload the loops into their mutual perpendicular position.

In production this is not a problem, but it is not possible for a consumer to completely rebuild the pedal without the fixture.

As the coil spring tightly contacts the sleeve, the coil spring causes gouging into the sleeve surface over time, and this means that a hard material such as steel must be used for the sleeve.

The problem with using steel is that it is very dense compared to other materials such as aluminum or plastic, and therefore this determines an increase in weight of the pedal, which might not be acceptable.

As the coil spring tightly contacts the sleeve, the latter must be allowed to rotate within the pedal body: consequently, the seals between the body and the sleeve must be of the dynamic kind.

Dynamic seals are more difficult to achieve compared to static seals, and they are more susceptible to leaking.

When the loop mechanism is assembled, the goal is, for the coil spring, to hold the loops as perpendicular to each other as possible.

However, it is difficult to manufacture a coil spring with precisely located leg ends; if the leg ends of the coil spring are not nearly perfectly located, a certain play occurs when there is some amount of rotational play between the loops.

If such play between the loops is too large, then the cleat engagement is compromised.

Another disadvantage is that, in this kind of pedals, there is currently no engagement force adjustment: in other words, there is no way for the rider to adjust how much force it takes to engage into, or out, of the pedal.

SUMMARY OF THE INVENTION

The technical aim of the present invention is therefore to improve the state of the art in the field of clipless bicycle pedals.

Within such technical aim, it is an object of the invention to develop a clipless bicycle pedal which allows to obviate the drawbacks previously complained.

A further object of the present invention is to develop a clipless bicycle pedal which does not require a fixture to assemble the loop mechanism.

Still another object of the present invention is to devise a clipless bicycle pedal suitable to prevent gouging phenomena into the sleeve which supports the loops of the locking mechanism.

Another object of the present invention is to develop a clipless bicycle pedal which does not need dynamic seals between the pedal body and the sleeve which supports the loops of the locking mechanism.

A further object of the present invention is to develop a clipless bicycle pedal free of mechanical play between loops of the locking mechanism.

Still another object of the present invention is to devise a clipless bicycle pedal which makes it possible to adjust the engagement force of the cleat into, or out of, the pedal.

Another object of the present invention is to develop a clipless bicycle pedal lighter than the pedal of known type.

This aim and these objects are all achieved by a clipless bicycle pedal comprising an axle, connectable to a bicycle crank arm, and a locking mechanism, connected to the axle, suitable to engage/disengage a cleat assembly of a cycling shoe.

The locking mechanism comprises a sleeve, inserted along the axle, an inner loop and an outer loop, inserted along the sleeve and free to rotate around the sleeve, so that the inner loop is contained within the outer loop.

The locking mechanism further comprises a cam, included between the inner loop and the outer loop, suitable to hold the inner loop and the outer loop in a locked configuration of the cleat assembly.

The cam is also suitable to allow said inner, outer loops to rotate relative to each other and to flex, from the locked configuration to an unlocked configuration of the cleat assembly.

The inner loop includes a first ring and a second ring, which are coaxial, and at least a bridge portion connecting the first ring to the second ring.

The outer loop includes a third ring and a fourth ring, which are coaxial, and at least a bridge portion connecting the third ring and the fourth ring.

The cam includes a cam ring interposed between the first ring of the inner loop and the third ring of the outer loop.

The cam ring includes a first cam surface; the cam also includes a second cam surface provided in the first ring of the inner loop, suitable to engage with the first cam surface.

The first cam surface and the second cam surface have the same profile, which is substantially zig-zag shaped and developed along a circumference; such profile includes peaks and dips, regularly alternated with each other.

In another embodiment of the invention, the clipless bicycle pedal comprises an axle, which is connectable to a bicycle crank arm, and a pedal body provided, on a first side, with a locking mechanism for a cleat assembly and, on a second side, with a standard platform.

The locking mechanism comprises a sleeve, inserted along the axle, an inner loop and an outer loop, inserted along the sleeve and free to rotate around the sleeve, so that the inner loop is contained within the outer loop.

The locking mechanism further comprises a cam, included between the inner loop and the outer loop, suitable to hold the inner loop and the outer loop in a locked configuration of the cleat assembly.

The cam is also suitable to allow the inner, outer loops to rotate and to flex, from the locked configuration to an unlocked configuration, in which the cleat assembly can be engaged/disengaged with/from the loops.

The inner loop includes a first ring, a second ring and a single bridge portion, which connects the first ring and the second ring.

The outer loop includes a third ring, a fourth ring, and a single bridge portion, which connects the third ring to the fourth ring.

BRIEF DESCRIPTION OF THE DRAWINGS

These and other advantages will be better understood by any man skilled in the art from the following description that follows and from the attached drawings, given as a non-limiting example, in which:

FIG. 1 is a perspective view of a clipless pedal according to the prior art;

FIG. 2 is a front view of the pedal of FIG. 1;

FIG. 3 is a perspective view of the locking mechanism of the pedal of FIG. 1;

FIG. 4 is an exploded view of the locking mechanism of the pedal of FIG. 1;

FIG. 5 is a perspective view of the clipless pedal according to the invention;

FIG. 6 is a front view of the pedal according to the invention;

FIG. 7 is a side view of the pedal according to the invention;

FIG. 8 is a section view of the pedal according to the invention, taken along plane VIII-VIII of FIG. 6;

FIG. 9 is an exploded view of the pedal according to the invention;

FIG. 10 is a top view of the clipless pedal according to the invention;

FIG. 11 is a perspective view of the inner loop of the locking mechanism of the pedal according to invention;

FIG. 12 is an exploded view of the locking mechanism of the pedal according to the invention;

FIG. 25 is a detailed top view of the clipless pedal, according to another embodiment of the invention;

FIG. 26 is a perspective view of the clipless pedal, according to a further embodiment of the invention;

FIG. 27 is a front view of the pedal of FIG. 26;

FIG. 28 is a section view of the pedal, taken along plane XXVIII-XXVIII of FIG. 27;

FIG. 29 is an exploded view of the pedal according to the embodiment of FIGS. 26-28;

DETAILED DESCRIPTION OF THE INVENTION

Figure 13:
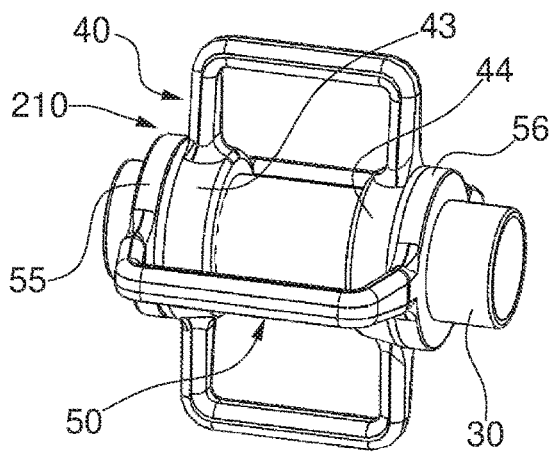
FIG. 13 is a perspective view of the locking mechanism of the pedal according to the invention, with the loops in the locked configuration.

With reference to FIGS. 5-21, a clipless bicycle pedal according to the invention is wholly indicated with 20.

The pedal 20 includes an axle 200; the axle 200 is connectable to a bicycle crank arm.

The axle 200 comprises a proximal end 202, which is threaded and connectable to a bicycle crank arm, and a distal end 204, which is also threaded.

The pedal 20 further includes a pedal body, wholly indicated with 22, rotatably connected to the axle 200.

More in detail, the pedal body 22 includes a first body portion 110, and a second body portion 130.

The first body portion 110 and the second body portion 130 are inserted along the axle 200, and they are rotatable with respect to the latter.

The first body portion 110 includes a first central element 111, affected by a first passing channel 115, and two first wings 112.

The second body portion 130 includes a second central element 131, affected by a second passing channel 135, and two second wings 132.

The first wings 112 and the second wings 132 match each other in order to conform a pedal body 22 having a closed loop shape (for example, hexagonal shape).

First wings 112 include respective first holes 114 which are threaded, while second wings 132 includes respective second holes 134, which are passing.

Two screws 150 are inserted in the second holes 134, and engaged in the first holes 114, so that, as the screws 150 are tightened, the end portions of first wings 112 and second wings 132 match each other.

The first passing channel 115 of the first body portion 110 comprises a first outer seat 116 for housing a first bearing 180, which rotatably supports the axle 200 by the first end 202.

The first bearing 180 is, for example, a needle bearing.

The first passing channel 115 of the first body portion 110 further comprises a first inner seat 118; the first inner seat 118 is separated from the first outer seat 116 by a first septum 119.

The second passing channel 135 of the second body portion 130 comprises a second outer seat 136 for housing a second bearing 140, which rotatably supports the axle 200 by the distal end 204.

The second bearing 140 is, for example, a cartridge ball bearing, having the outer ring in engagement in the second outer seat 136.

The first outer seat 116 is closed by a lip seal 190.

The axle 200 comprises a shoulder 206 by the distal end 204, at which the second bearing 140 is mounted.

A nut 160 is screwed on the distal end 204 of the axle 200, and it holds the inner ring of the second bearing 140 in engagement in the second outer seat 136.

The second outer seat 136 of the second body portion 130 is closed by an end cap 170; the end cap 170 is screwed into a nut screw provided for in the second outer seat 136. The second body portion 130 comprises a second inner seat 138; the second inner seat 138 is separated from the second outer seat 136 by a second septum 139.

The first body portion 110 comprises a first O-ring seal 90, which engages the first inner seat 118; a first bushing 80 holds the first O-ring seal 90 in position.

The second body portion 130 comprises a second O-ring seal 92, which engages the second inner seat 138; a second bushing 120 holds the second O-ring seal 92 in position.

The pedal 20 comprises a locking mechanism 210 for the cleat assembly 400 of a cycling shoe.

Figure 34:
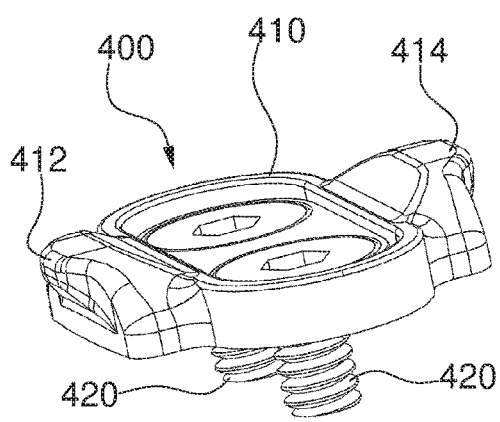
FIG. 34 is a perspective view of a cleat assembly according to the prior art.

The locking mechanism 210 is suitable to engage/disengage a cleat assembly 400 of known type, shown in FIG. 34.

The cleat assembly 400 of known type includes a cleat 410 and screws 420, or other elements, that allow the cleat 410 to be mounted to the bottom of a cycling shoe (not shown).

The cleat 410 comprises a first projection 412, and a second projection 414, opposed to each other, suitable to engage/disengage the locking mechanism 210 of the pedal 22, as better clarified later.

The locking mechanism 210 is rotatably connected to the axle 200.

The locking mechanism 210 includes a sleeve 30.

The sleeve 30 is inserted along the axle 200 (along the central portion of the axle 200); more in detail, the sleeve 30 is interposed between the first body portion 110 and the second body portion 130.

The sleeve 30 has a tubular shape, for example a cylindrical tubular shape; the sleeve 30 includes a first end 32 and a second end 34 (FIG. 12).

The first end 32 of the sleeve 30 engages the first inner seat 118 of the first body portion 110, and it abuts a washer 100 provided for in the inner seat 118; the second end 34 of the sleeve 30 engages the second inner seat 138 of the second body portion 130.

The locking mechanism 210 further includes an inner loop 40 and an outer loop 50.

The inner loop 40 and the outer loop 50 are inserted along the sleeve 30, so that the inner loop 40 is contained within the outer loop 50.

The inner loop 40 and the outer loop 50 are designed so that they are free to rotate on the sleeve 30, or around the sleeve 30: for this reason, the sleeve 30 can have a tight static squeeze against the first O-ring seal 90 and the second O-ring seal 92, in order to better prevent contamination intrusion.

The locking mechanism 210 further comprises a cam 60.

The cam 60 is included between the inner loop 40 and the outer loop 50.

The cam 60 is suitable to hold the inner loop 40 and the outer loop 50 in a locked configuration of the cleat assembly 400.

In said locked configuration of the cleat assembly 400, the inner loop 40 and the outer loop 50 may be perpendicular to each other, or they can form an angle other than 90° between them.

The locked configuration in which the inner loop 40 and the outer loop 50 are perpendicular to each other is particularly advantageous, because it allows to obtain four engagement seats for the cleat assembly 400.

The cam 60 is also suitable to allow the rotational movement of the inner, outer loops 40,50 relative to each other, from the locked configuration to an unlocked configuration, in which the cleat assembly 400 can be engaged/disengaged with/from the loops 40,50.

The locking mechanism 210 further comprises a washer 70.

The washer 70 is also included between the inner loop 40 and the outer loop 50, on the opposite side with respect to the cam 60.

The inner loop 40 includes a first ring 43 and a second ring 44, which are coaxial.

The inner loop 40 further includes at least a bridge portion 45,46 connecting the first ring 43 to the second ring 44.

More in detail, the inner loop 40 further includes a first bridge portion 45 and a second bridge portion 46.

The first bridge portion 45 and the second bridge portion 46 connect the first ring 43 to the second ring 44 from opposite sides; the first bridge portion 45 and the second bridge portion 46 are arranged on the same plane.

The outer loop 50 includes a third ring 55 and a fourth ring 56, which are coaxial.

The outer loop 50 further includes at least a bridge portion 58,59 connecting the third ring 55 to the second ring 56.

More in detail, the outer loop 50 includes a third bridge portion 58 and a fourth bridge portion 59.

The third bridge portion 58 and the fourth bridge portion 59 connect the third ring 55 and the fourth ring 56 from opposite sides; the third bridge portion 58 and the fourth bridge portion 59 are arranged on the same plane.

The third ring 55 of the outer loop 50 comprises slots 53,54, which affect its internal surface.

For example, the third ring 55 includes two slots 53,54, which are diametrically opposed.

The cam 60 includes a cam ring 65.

The cam ring 65 it is connected to the third ring 55 of the outer loop 50.

The cam ring 65 comprises an outer surface 61 provided with tabs 63,64, suitable to engage with the afore mentioned slots 53,54 of the third ring 55.

For example, the cam ring 65 comprises two tabs 63,64, which are diametrically opposed.

The cam 60 further comprises a first cam surface 62; the first cam surface 62 is provided in the cam ring 65.

The first cam surface 62 is located on the opposite side with respect to outer surface 61, in other words it is arranged on the inner surface of the cam ring 65, in the assembled configuration.

The cam 60 includes a second cam surface 42.

The second cam surface 42 is provided in the first ring 43 of the inner loop 40.

The second cam surface 42 is suitable to engage with the first cam surface 62.

The first cam surface 62 and the second cam surface 42 have the same profile; in other words, the first cam surface 62 and the second cam surface 42 fit perfectly as the first ring 43 abuts against the cam ring 65.

The profile of the first cam surface 62, and of the second cam surface 42, is substantially zig-zag shaped, and it is developed along a circumference.

In other words, the profile of the first cam surface 62 and of the second cam surface 42 includes peaks and dips, regularly alternated with each other.

The second cam surface 42 is made along the inner surface of the first ring 43, as shown in FIG. 11.

The first ring 43 is substantially cup-shaped, in order to completely contain the cam ring 65, in assembled configuration.

The fourth ring 56 of the outer loop 50 has an inner surface 57, suitable to abut against the washer 70; correspondingly, the second ring 44 of the inner loop 40 has an outer surface 47 suitable to abut against the washer 70.

According to an embodiment of the invention, the washer 70 is thicker than the space comprised between the inner surface 57 of the outer loop 50 and the outer surface 47 of the inner loop 40.

Therefore, in order to install the washer 70, the third bridge portion 58 and the fourth bridge portion 59 of the outer loop 50 are squeezed (along the symmetry axis of the rings 55,56) lightly in a vice (or by other means), which increases the space between outer surface 47 and inner surface 57.

In this way, the washer 70 easily slides into position, and preloads the first cam surface 62 against the second cam surface 42: consequently, the inner loop 40 and the outer loop 50 are held in the locked configuration (for example, perpendicular to each other).

The inner loop 40 and the outer loop 50 can be made of stainless steel (for example investment cast stainless steel), or any other suitable material or process.

The sleeve 30 can be made of many materials such as steel, aluminum, or various polymers.

The washer 70 is made of a low friction material such as Delrin® AF, or other suitable material.

Figure 15:
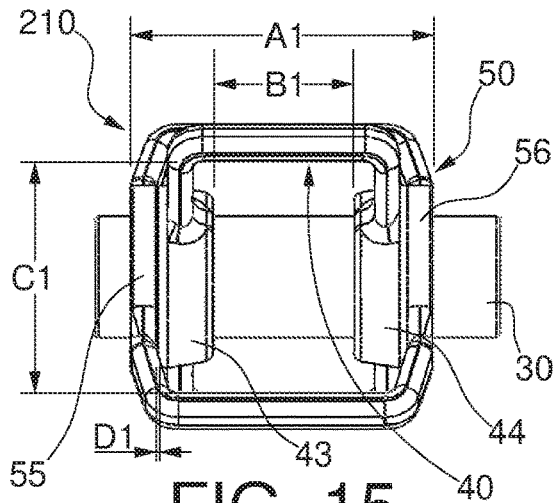
FIG. 15 is a side view of the locking mechanism of the pedal according to the invention, with the loops in the locked configuration.
Figure 17:
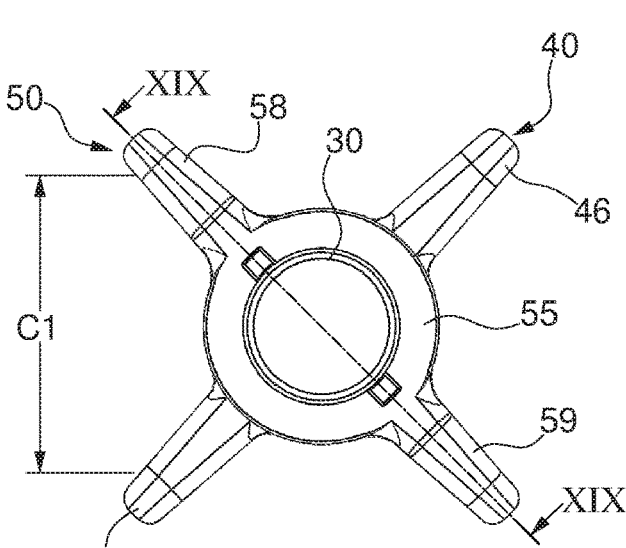
FIG. 17 is a front view of the of the locking mechanism of the pedal according to the invention, with the loops in the locked configuration.

FIGS. 13,15,17 show the locking mechanism 210 of the pedal 20 before movement of the loops 40,50, in the configuration in which the inner loop 40 and the outer loop 50 are in the locked configuration, for example perpendicular to each other.

Figure 14:
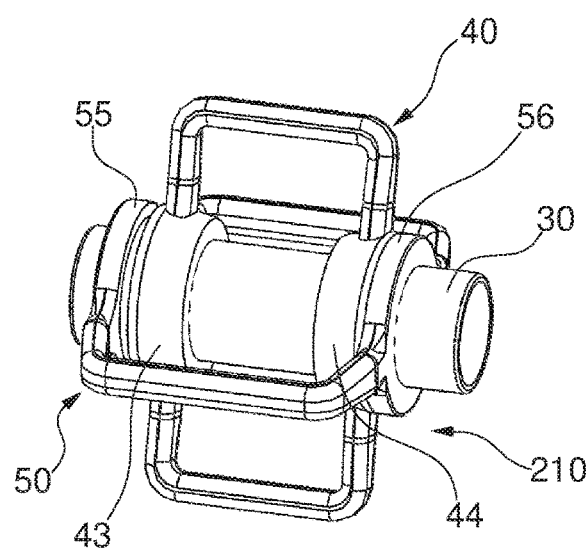
FIG. 14 is a perspective view of the locking mechanism of the pedal according to the invention, with the loops rotated in the unlocked configuration, ready to engage/disengage a cleat.
Figure 16:
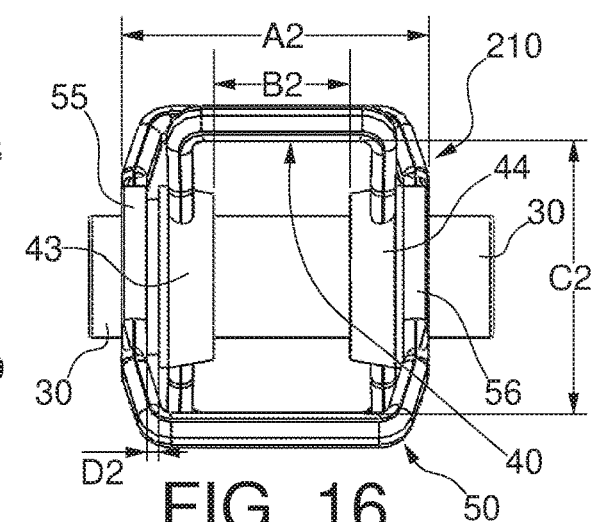
FIG. 16 is a side view of the locking mechanism of the pedal according to the invention, with the loops in the unlocked configuration, ready to engage/disengage a cleat.
Figure 18:
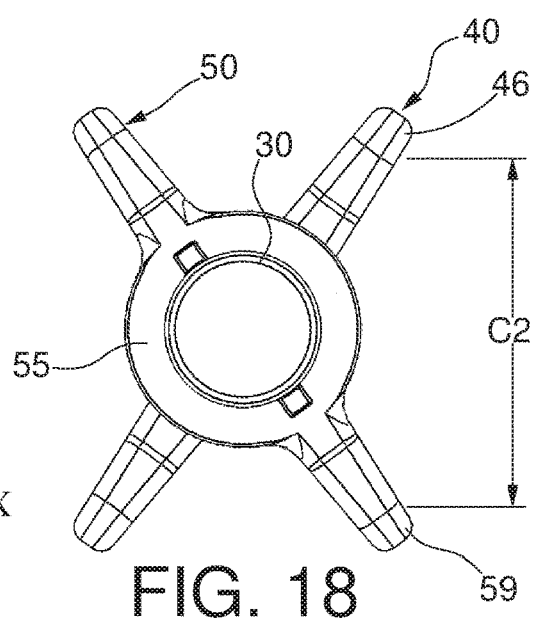
FIG. 18 is a front view of the locking mechanism of the pedal according to the invention, with the loops rotated in the unlocked configuration, ready to engage/disengage a cleat.
Figure 19:
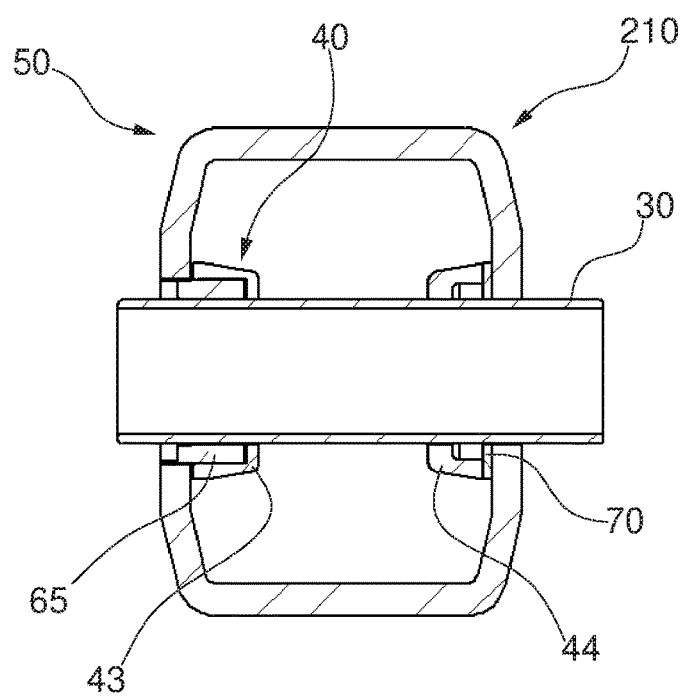
FIG. 19 is a section view of the locking mechanism, taken along plane XIX-XIX of FIG. 17.

FIGS. 14,16,18 show the locking mechanism 210 in the configuration in which the inner loop 40 and the outer loop 50 are in an unlocked configuration, i.e. rotationally moved relative to each other.

In FIG. 15, A1 is the width of the outer loop 50 in the configuration wherein the loops 40,50 are in the locked configuration, for example perpendicular to each other.

B1 is the distance between the first ring 43 and the second ring 44 of the inner loop 40 in the configuration wherein the loops 40,50 are in the locked configuration.

D1 is the distance between the third ring 55 of the outer loop 50 and the outer surface 61 of the cam ring 65, in the configuration wherein the loops 40,50 are in the locked configuration.

C1 is the distance between the first bridge portion 45 of the inner loop 40 and the third bridge portion 58 of the outer loop 50 (or between the second bridge portion 46 of the inner loop 40 and the fourth bridge portion 59 of the outer loop 50) in the configuration wherein the loops 40,50 are in the locked configuration.

In FIG. 16, A2 is width of the outer loop 50 in the configuration wherein the loops 40,50 are in the unlocked configuration, i.e. rotationally moved relative to each other.

B2 is the distance between the first ring 43 and the second ring 44 of the inner loop 40 in the configuration wherein the loops are in the unlocked configuration, i.e. rotationally moved relative to each other.

D2 is the distance between the third ring 55 of the outer loop 50 and the outer surface 61 of the cam ring 65, in the configuration wherein the loops 40,50 are in the unlocked configuration, i.e. rotationally moved relative to each other.

C2 is the distance between the first bridge portion 45 of the inner loop 40 and the third bridge portion 58 of the outer loop 50 (or between the second bridge portion 46 of the inner loop 40 and the fourth bridge portion 59 of the outer loop 50) in the configuration wherein the loops 40,50 are in the unlocked configuration, i.e. rotationally moved relative to each other.

Width A1 is smaller than A2, and distance B1 is bigger than B2, because the rotational movement of the inner loop 40 and of the outer loop 50 from the locked (perpendicular) configuration (FIGS. 13,15,17) to the unlocked (non-perpendicular) configuration (FIGS. 14,16,18) causes cam 60 to increase distance D1 to D2, and this requires inner, outer loops 40,50 to elastically bend, in particular, to elastically bend along the symmetry axis of the sleeve 30.

Consequently, the rotational movement of inner loop 40 and outer loop 50 relative to one another causes distance C1 to increase to C2, and this allows a cleat 410 to engage or disengage with locking mechanism 210.

Figure 20:
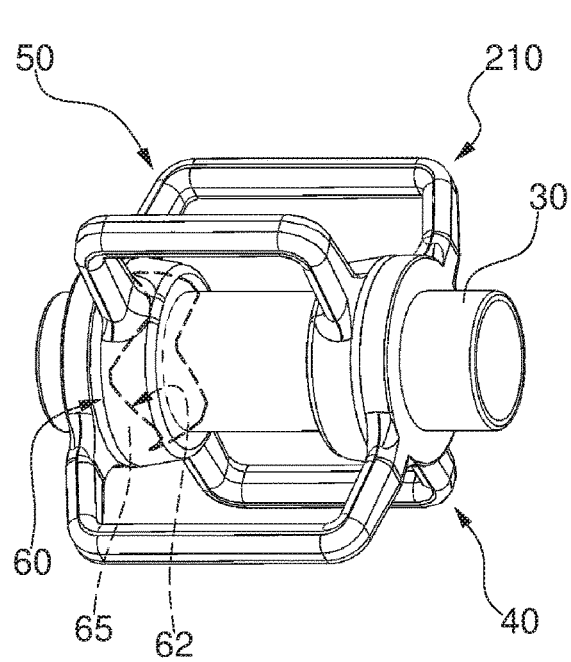
FIG. 20 is a perspective view of the locking mechanism of the pedal with the loops in the locked configuration, and with the cam surfaces shown in hidden lines.
Figure 21:
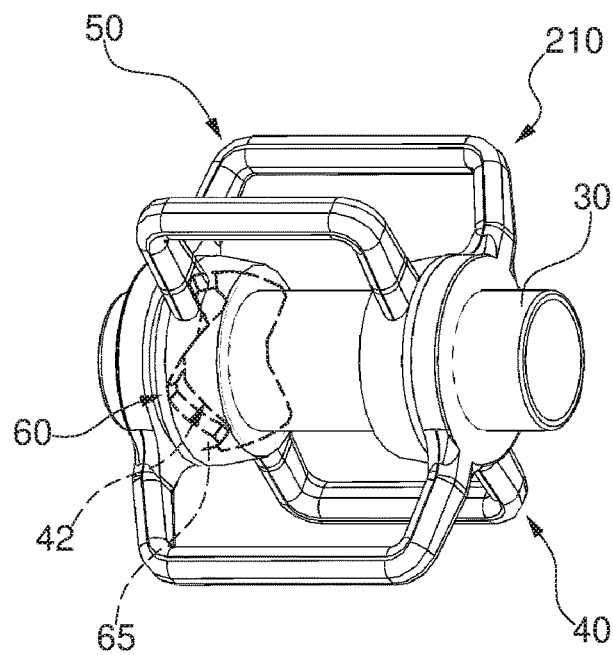
FIG. 21 is a perspective view of the locking mechanism of the pedal with the loops rotated in the unlocked configuration, ready to engage/disengage a cleat, and with the cam surfaces shown in hidden lines.

FIGS. 20,21 respectively show perspective views of the locking mechanism 210 before and after the rotational movement of the inner loop 40 and of the outer loop 50, wherein the contact between the cam ring 65 and the inner loop 40 is shown in hidden lines. More in detail, in the configuration of FIG. 20 the first cam surface 62 and the second cam surface 42 fit perfectly, holding loops 40,50 in the locked configuration.

In the configuration of FIG. 21, the inner loop 40 is rotationally moved relative to the outer loop 50, as the rider forces the cleat 410 between the loops 40,50, and this causes the first cam surface 62 and the second cam surface 42 to slide against each other, in a configuration in which they no longer match: on turn, this forces the inner loop 40 and the outer loop 50 to elastically bend along the symmetry axis of the sleeve 30, allowing the engagement of the cleat 410 with the locking mechanism 210.

As a result, the locking mechanism 210 according to the invention allows the inner loop 40 and the outer loop 50 to rotate with respect to each other, and in contrast to an elastic return action (provided by the sliding of the first cam surface 62 and of the second cam surface 42 on each other), from the locked configuration (FIGS. 13,15,17) to the unlocked configuration (FIGS. 14,16,18) without the need of a coil spring comprised between the inner loop 40 and the outer loop 50.

All the drawbacks due to the presence of the coil spring are therefore eliminated.
The user no longer needs a fixture to assemble the locking mechanism 210.

Gouging phenomena on the sleeve 30 are eliminated: therefore, the sleeve 30 can be made of a material which is lighter than steel (for example aluminum or plastic).

The sleeve 30 no longer rotates with respect to the pedal body 22: the seals 90,92 can be of the static kind, which are more leak resistant than those of the dynamic kind.

Play between the inner loop 40 and the outer loop 50 is eliminated or at least significantly reduced, because the surfaces 42,62 of cam 60 can be accurately manufactured in order to obtain a precise coupling.

Figure 22:
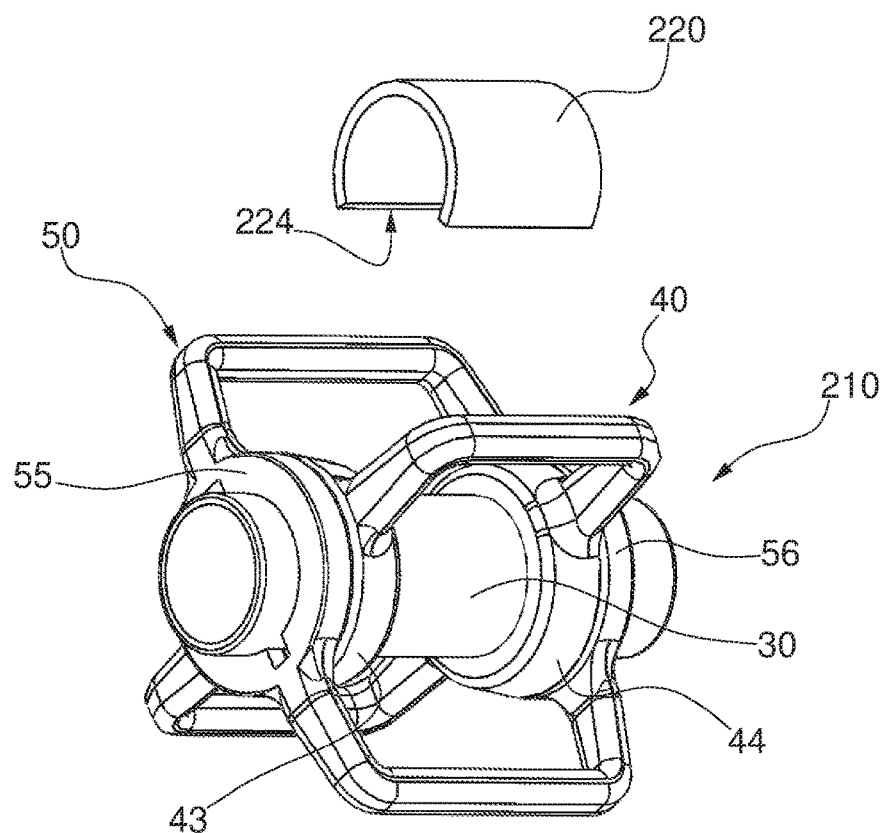
FIG. 22 is a perspective view of the locking mechanism of the pedal according to the invention, with the loops in the locked configuration and with a snap-on spacer ready to install, in order to increase spring force.
Figures 23, 24:
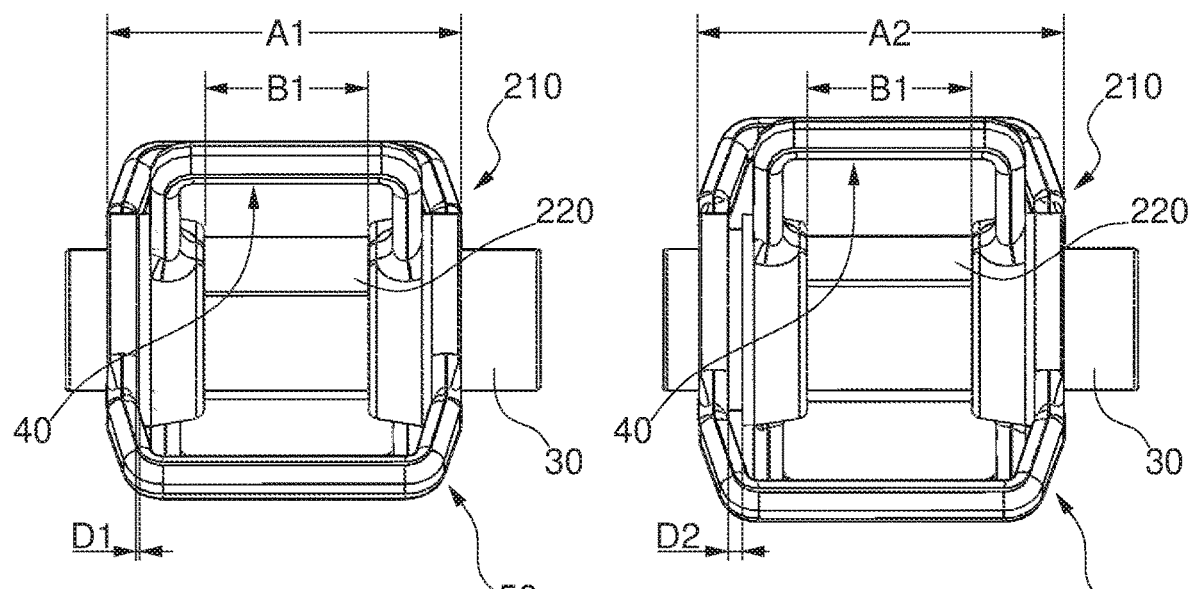
FIG. 23 is a side view of the locking mechanism of the pedal, with the loops in the locked configuration and with the snap-on spacer installed, to increase spring force.
FIG. 24 is a side view of the locking mechanism of the pedal, with the loops rotated in the unlocked configuration, ready to engage/disengage a cleat, and with the snap-on spacer installed to increase spring force.

Another embodiment of the clipless pedal 20 according to the invention is shown in FIGS. 22-24 (in particular, a detail of the locking mechanism 210 is shown).

In this embodiment of the invention, the locking mechanism comprises 210 a solution to increase the force required to engage and disengage a cleat 410 with the locking mechanism 210.

As previously discussed, the rotational movement of the inner, outer loops 40,50 relative to each other causes both the loops 40,50 to elastically bend along the symmetry axis of the sleeve 30.

However, by restricting the bending of either the inner loop 40 or outer loop 50, the inner loop 40, or the outer loop 50, is caused to bend further than without restriction, which increases the spring rate of the locking mechanism 210.

In connection therewith, in this embodiment of the invention the locking mechanism 210 comprises at least a spacer 220, placed along the sleeve 30 and included between the first ring 43 and the second ring 44 of the inner loop 40.

The spacer 220 is of the snap-on kind.
The spacer 220 has a length—along the symmetry axis of the sleeve 30—such that the inner loop 40 cannot bend inwards, as the rider tries to engage/disengage the cleat 410 with/from the locking mechanism 210: this causes the outer loop 50 to bend more during engagement/disengagement of the cleat 410, which requires more force than without spacer 220 installed.

In FIGS. 22 and 23, the inner loop 40 and the outer loop 50 are in the locked configuration (for example, perpendicular each other); in FIG. 24, the inner loop 40 and the outer loop 50 are in the unlocked configuration, ready to engage, or disengage, a cleat 410.

In both the configurations of FIGS. 22,23, the first ring 43 and the second ring 44 are at the same distance B1 (which corresponds to the length of spacer 220), and this means that the inner loop 40 is not deformed/flexed in the non-perpendicular configuration of the loops 40,50.

Conversely, width A2 (FIG. 24) is bigger than width A1 (FIG. 23), in order to allow distance D2 to be bigger than distance D1.

The spacer 220 has tubular shape, with a missing portion in order to define a snap-on insertion opening 224 for the sleeve 30.

In an embodiment of the invention, the thickness of the washer 70 can be, for example, 1.0 mm.

In other embodiments of the invention, the locking means 210 can comprise a thicker washer 70, or a thinner washer 70, which can respectively increase/decrease the spring rate of the locking mechanism 210 (or preload of locking mechanism 210), thereby making it more difficult/easier to engage/disengage the cleat 410 with/from locking mechanism 210.

Another embodiment of the clipless pedal 20 according to the invention is shown in FIG. 25.

In this embodiment of the invention, the locking mechanism 210 comprises an outer spacer 300, installed between the pedal body 22 and the outer loop 50.

More particularly, the outer spacer 300 is installed, on the sleeve 30, between the first body portion 110 and the outer loop 50 (in the gap E), or between the second body portion 130 and the outer loop 50.

The outer spacer 300 is substantially C-shaped, so that it can be snapped onto the sleeve 30.

Due to the presence of the outer spacer 300, the outer loop 50 can no longer bend outwards, along the symmetry axis of the sleeve 30, during rotational movement of the loops 40,50: this causes the inner loop 40 to flex more than it would happen without outer spacer 300, and therefore the spring rate of the locking mechanism 210 increases.

Another embodiment of the clipless pedal 250 according to the invention is shown in FIGS. 26-29.

This embodiment has some constructive differences with respect to the embodiments previously described.

In fact, in this embodiment the pedal 250 does not include a pedal body constructively separate from the locking mechanism 210; conversely, the locking mechanism 210 constitutes itself the pedal body.

The pedal 250 includes an axle 200, which is identical to the one included in the previous embodiments.

The locking mechanism 210 comprises a sleeve 270, inserted along the axle 200.

The locking mechanism 210 further includes an inner loop 40 and an outer loop 260; the inner loop 40 is substantially identical to the one disclosed in the previous embodiments.

The sleeve 270 includes a first end portion 272 of larger diameter; in the assembled configuration of the pedal 250, the first end portion 272 is in the vicinity of the proximal end 202 of the axle 200.

The first end portion 272 houses the first bearing 180 and the lip seal 190; a further lip seal 280 closes the first end portion 272 of the sleeve 270.

The sleeve 270 includes a second end portion 274, provided with an annular groove 276 for an O-ring seal 290.

The sleeve 270 includes an outer threaded portion 278; the outer threaded portion 278 is contiguous to the first end portion 272 of larger diameter.

The outer loop 260 includes a third ring 55, a fourth ring 56, a third bridge portion 58 and a fourth bridge portion 59, as described for the previous embodiments.

The third ring 55 of the outer loop 260 includes a first extension 262, which is projected outwards with respect to the inner loop 40.

The first extension 262 includes a first inner nut screw 263, into which the threaded portion 278 of the sleeve 270 is screwed: therefore, the outer loop 260 is rigidly connected to the sleeve 270.

The fourth ring 56 of the outer loop 260 includes a second extension 264, which is projected outwards with respect to the inner loop 40; the second extension 264 substantially performs the function of the second body portion 130 disclosed in the previous embodiments. In fact, the second extension 264 houses the second bearing 140, and it includes a second inner nut screw 265, into which the end cap 170 is screwed.

In practice, therefore, in this embodiment of the invention, the outer loop 260 has a configuration which is suitable to perform the same mechanical functions of the pedal body 22 of the previous embodiments.

In other words, this is a simplified construction solution compared to the previous ones.

Figure 30:
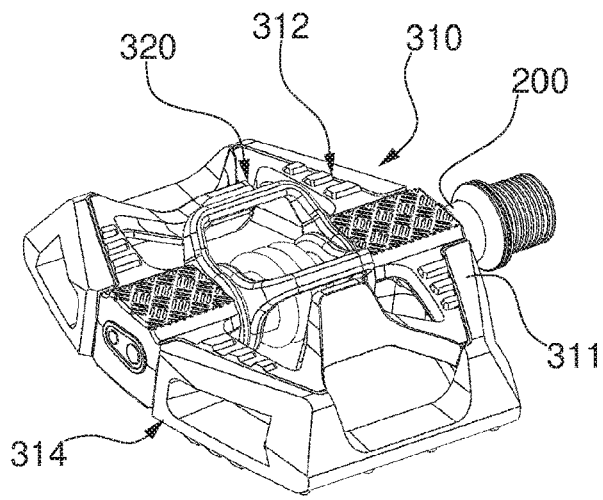
FIG. 30 is a perspective view of a clipless pedal according to the prior art.

FIG. 30 is a perspective view of another kind of clipless pedal 310 according to the prior art, including a pedal body 311 which comprises, on a first side 312, a locking mechanism 320 for a cleat 410 and, on a second side 314, a standard platform (also known as "flat pedal").

Figure 31:
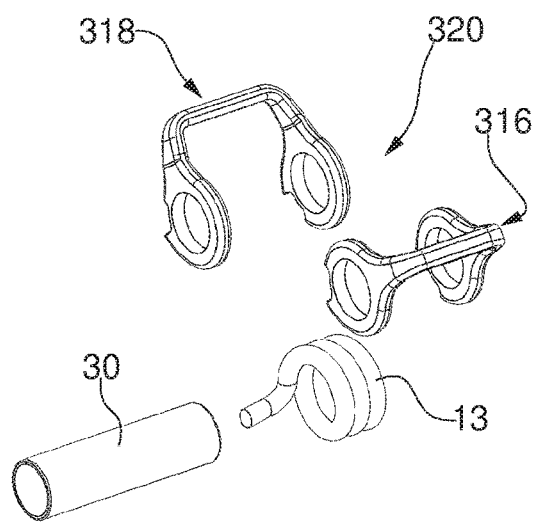
FIG. 31 is an exploded view of the locking mechanism of the pedal of FIG. 30, according to the prior art.

The locking mechanism 320 of this kind of clipless pedal 310, according to the prior art, is shown in FIG. 31.

The locking mechanism 320 comprises a sleeve 30, inserted along the axle 200 of the pedal 310, an inner loop 316, an outer loop 318 and a coil spring 13, inserted along the sleeve 30, and assembled in the manner disclosed with reference to the embodiment of FIG. 1.

Unlike previous embodiments, the inner loop 316 and the outer loop 318 include respective pairs of opposing rings, connected by a single bridge portion: therefore, the locking mechanism 320, in this kind of pedal, includes a single seat that can be engaged with the cleat 410.

Figure 32:
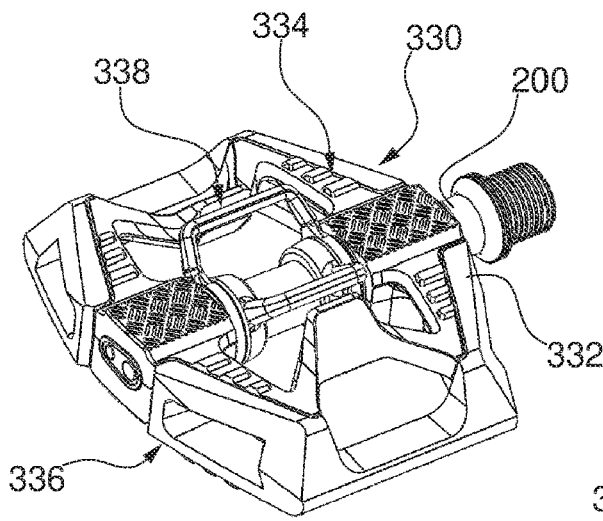
FIG. 32 is a perspective view of the clipless pedal according to another embodiment of the invention.
Figure 33:
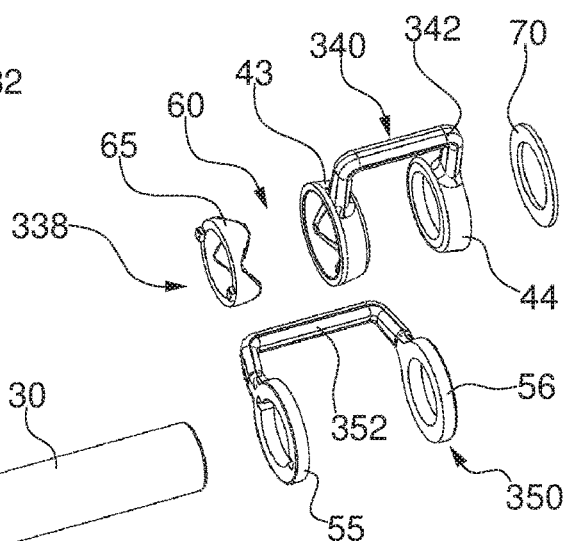
FIG. 33 is an exploded view of the locking mechanism of the pedal of FIG. 32.

FIGS. 32,33 show another embodiment of the clipless pedal 330 according to the invention, while a cleat assembly according to the prior art is shown in FIG. 34.

The embodiment of the pedal 330 shown in FIGS. 32,33 is of the kind where the pedal body 332 comprises, on a first side 334, a locking mechanism 338 for a cleat 400 assembly and, on a second side 336, a standard platform (also known as "flat pedal").

The locking mechanism 338 of this embodiment of the invention (shown in FIG. 33) works in the manner already disclosed for the previous embodiments.

The locking mechanism 338 includes a sleeve 30, inserted along the axle 200 of the pedal 330.

The locking mechanism 338 further includes an inner loop 340, an outer loop 350, a cam 60 and a washer 70, all inserted along the sleeve 30 in the way already disclosed for the previous embodiments.

The inner loop 340 includes a first ring 43 and a second ring 44, which are identical to those disclosed for the previous embodiments, and a single bridge portion 342, which connects the first ring 43 to the second ring 44.

The outer loop 350 includes a third ring 55 and a fourth ring 56, which are identical to those disclosed for the previous embodiments, and a single bridge portion 352, which connects the third ring 55 to the fourth ring 56.

The cam 60 and the washer 70 are identical to those disclosed for the previous embodiments.

As with previous embodiments, the cam 60 holds the inner loop 340 and the outer loop 350 in the locked configuration (for example, perpendicular to each other).

As loops 340,350 are forced, by the cleat 410, to rotationally move relative to each other, the cam 60 forces the loops 340 and 350 to elastically bend along the symmetry axis of the sleeve 30.

A spacer 220, like the one shown in the embodiment of FIG. 22, could be installed onto the sleeve 30, in order to increase the force to engage and disengage with a cleat 410.

According to the invention, the locking mechanism 338 of this embodiment of the invention is lighter than prior art mechanism 320, is easier to assemble and it has better performance in mud.

It has thus been seen how the invention achieves the proposed aims.

In all the embodiment disclosed, the pedal according to the invention does not require a fixture to assemble the loop mechanism: it is only necessary to elastically bend the outer loop in order to correctly position the washer.

In all the embodiment disclosed, gouging phenomena into the sleeve are prevented, because the loops of the locking mechanism can freely rotate around the sleeve.

Again, since the sleeve does not rotate around the axle of the pedal, no dynamic seals are needed between the pedal body and the sleeve which supports the loops of the locking mechanism.

The use of the pedal according to the invention is more comfortable with respect to prior art pedals, because the locking mechanism is free of mechanical play between loops.

The pedal according to the invention allows adjusting the engagement force of the cleat into, or out of, the pedal, by adding elements (in particular, spacers) which prevent the inner loop, or the outer loop, of the locking mechanism to elastically bent along the symmetry axis of the sleeve.

In the embodiments previously disclosed, individual features, given in connection with such specific embodiments, may actually be interchanged with other different features that exist in other embodiments.

The present invention has been described according to preferred embodiments, but equivalent variants can be devised without departing from the scope of protection offered by the following claims.

The invention claimed is:

1. A clipless bicycle pedal, comprising
an axle connectable to a bicycle crank arm,
a locking mechanism, connected to said axle, that engages and disengages a cleat assembly of a cycling shoe,
wherein said locking mechanism comprises:
a sleeve, inserted along said axle, having a symmetry axis,
an inner loop and an outer loop, inserted along said sleeve and free to rotate around said sleeve, so that said inner loop is contained within said outer loop,
a cam, included between said inner loop and said outer loop, that holds said inner loop and said outer loop in a locked configuration of the cleat assembly,
wherein said cam is configured to allow said inner loop and said outer loop to rotate relative to each other and to elastically bend along the symmetry axis of said sleeve, from said locked configuration to an unlocked configuration, in which the cleat assembly is engageable and disengageable with the inner loop and the outer loop, wherein said inner loop includes a first ring and a second ring, which are coaxial, and at least a bridge portion connecting said first ring to said second ring, and wherein said outer loop includes a third ring and a fourth ring, which are coaxial, and at least a bridge portion connecting said third ring to said fourth ring, and wherein said cam is interposed between said first ring of said inner loop and said third ring of said outer loop, and wherein said cam includes a cam ring provided with a first cam surface, and a second cam surface, provided in said first ring of said inner loop, wherein said second cam surface is configured to engage with said first cam surface.

2. The clipless bicycle pedal according to claim 1, wherein said first cam surface has a first profile, said second cam surface has a second profile, wherein said first profile and said second profile are matching and substantially zig-zag shaped and developed along a circumference, and wherein said first profile and said second profile include peaks and dips regularly alternated with each other.

3. The clipless bicycle pedal according to claim 1, wherein said second cam surface is made along the inner surface of said first ring.

4. The clipless bicycle pedal according to claim 1, wherein said third ring of said outer loop comprises slots which affects its internal surface, and wherein said cam ring comprises an outer surface, opposite to said first cam surface, provided with tabs configured to engage said slots of said third ring.

5. The clipless bicycle pedal according to claim 1, wherein said locking mechanism comprises a washer, included between said inner loop and said outer loop, on the opposite side with respect to said cam.

6. The clipless bicycle pedal according to claim 5, wherein said washer is able to preload said first cam surface against said second cam surface, and consequently said inner loop and said outer loop are held in said locked configuration of said cleat assembly.

7. The clipless bicycle pedal according to claim 5, wherein said washer is made of Delrin AF.

8. The clipless bicycle pedal according to claim 1, wherein said inner loop and said outer loop are made of stainless steel.

9. The clipless bicycle pedal according to claim 1, wherein said sleeve is made of a material chosen between steel, aluminum and polymers.

10. The clipless bicycle pedal according to claim 1, wherein said locking mechanism comprises at least a spacer, placed along said sleeve and included between said first ring and said second ring of said inner loop.

11. The clipless bicycle pedal according to claim 10, wherein said spacer is of the snap-on kind, and wherein said spacer has a length, along the symmetry axis of said sleeve, such that said inner loop cannot bend inwards.

12. The clipless bicycle pedal according to claim 1, including a pedal body, rotatably connected to said axle, wherein said pedal body includes a first body portion and a second body portion inserted along said axle, and rotatable with respect to said axle.

13. The clipless bicycle pedal according to claim 12, wherein said locking mechanism includes an outer spacer, installed between said pedal body and said outer loop.

14. The clipless bicycle according to claim 13, wherein said outer spacer is installed, on said sleeve, between said first body portion and said outer loop, or between said second body portion and said outer loop, wherein due to the presence of said outer spacer, said outer loop cannot flex outwards during rotational movement of said inner loop and said outer loop.

15. The clipless bicycle pedal according to claim 1, wherein said sleeve, inserted along said axle, is provided with an outer threaded portion, and wherein said outer loop includes a first extension provided with a nut screw, into which said threaded portion of said sleeve is screwed.

16. The clipless bicycle pedal according to claim 15, wherein said sleeve includes a first end portion of larger diameter, which houses a first bearing mounted on said axle, and wherein said outer loop includes a second extension, which houses a second bearing mounted on said axle.

17. A clipless bicycle pedal, comprising
an axle connectable to a bicycle crank arm,
a pedal body provided, on a first side, with a locking mechanism for a cleat assembly and, on a second side, with a platform, wherein said locking mechanism comprises:
a sleeve, inserted along said axle,
an inner loop and an outer loop, inserted along said sleeve and free to rotate around said sleeve, so that said inner loop is contained within said outer loop,
a cam, included between said inner loop and said outer loop, that holds said inner loop and said outer loop in a locked configuration of the cleat assembly,
wherein said cam allows said inner loop and said outer loop to rotate relative to each other and to elastically bend along the symmetry axis of said sleeve, from said locked configuration to an unlocked configuration, in which the cleat assembly engages and disengages with the inner loop and the outer loop,
wherein said inner loop includes a first ring, a second ring and a single bridge portion, which connects said first ring to said second ring,
and wherein said outer loop includes a third ring, a fourth ring, and a single bridge portion, which connects said third ring to said fourth ring,
and wherein said cam includes a cam ring provided with a first cam surface, and a second cam surface provided in said first ring of said inner loop, wherein said second cam surface is configured to engage with said first cam surface.

18. The clipless bicycle pedal according to claim 17, wherein said first cam surface has a first profile, said second cam surface has a second profile, wherein said first profile and said second profile are matching and substantially zig-zag shaped and developed along a circumference, and wherein said first profile and said second profile include peaks and dips regularly alternated with each other.

19. The clipless bicycle pedal according to claim 17, wherein said locking mechanism comprises a washer, included between said inner loop and said outer loop, on the opposite side with respect to said cam.

20. The clipless bicycle pedal according to claim 19, wherein said washer is able to preload said first cam surface against said second cam surface, and consequently said inner loop and said outer loop are held in said locked configuration of said cleat assembly.

* * * * *